Figure 1:
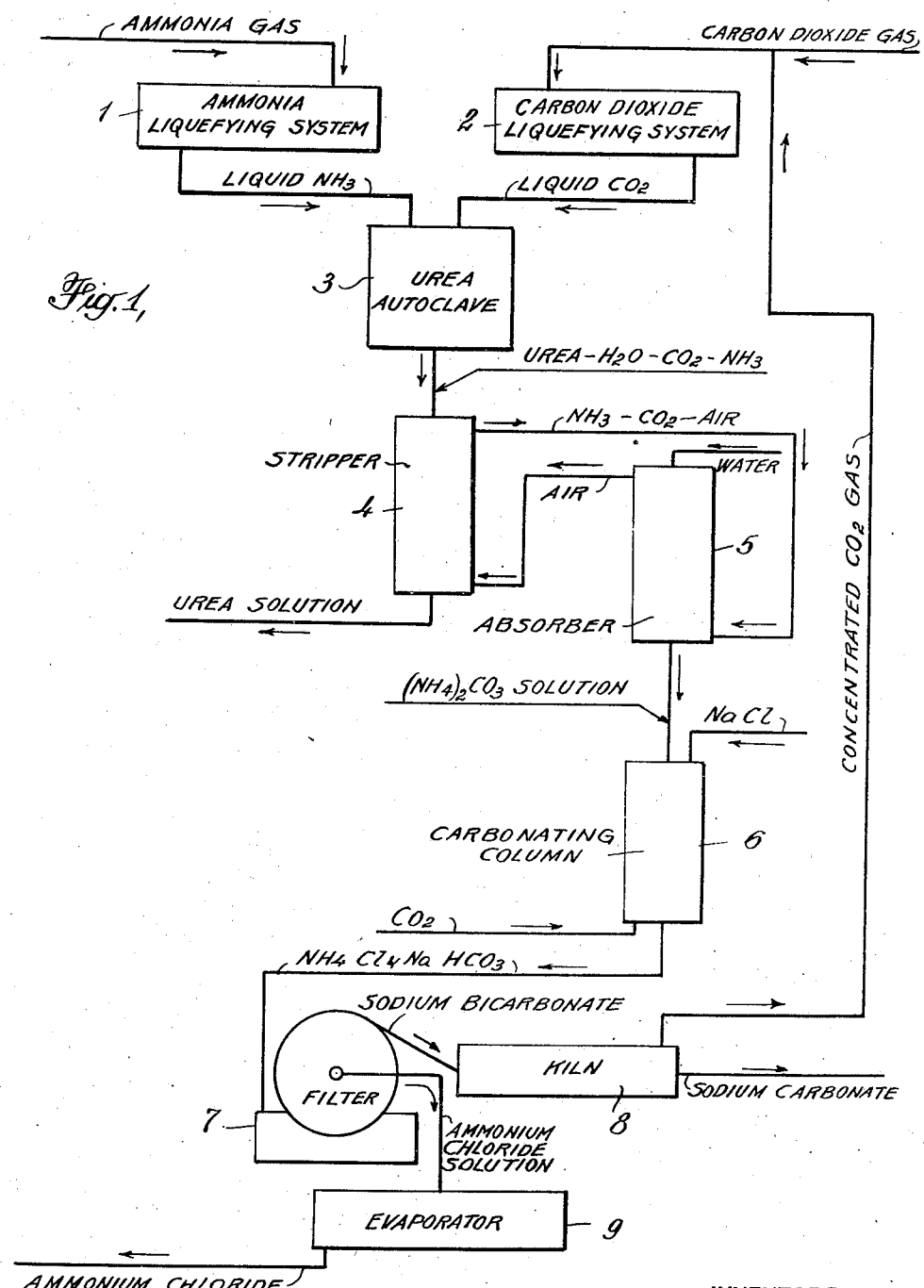

Patented July 20, 1937

2,087,325

UNITED STATES PATENT OFFICE 2,087,325

PROCESS FOR THE PRODUCTION OF UREA AND AMMONIUM SALTS

Charles K. Lawrence, Syracuse, N. Y., and Herman A. Beekhuis, Jr., Petersburg, Va., assignors, by mesne assignments, to The Solvay Process Company, New York, N. Y., a corporation of New York Application September 13, 1933, Serial No. 689,246

15 Claims. (Cl. 260—125)

This invention relates to a process for the production of urea and ammonium salts such as ammonium carbonates, ammonium chloride, ammonium nitrate or ammonium sulfate.

It is known to produce urea by heating ammonia and carbon dioxide under pressure to convert the materials into urea in accordance with the following equation:

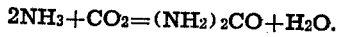

$$2NH_3 + CO_2 = (NH_2)_2CO + H_2O.$$

This reaction under the conditions employed for carrying it out does not go to completion so that the reaction product recovered from an autoclave in which synthesis of urea is carried out contains in addition to the urea and water (the products of the above reaction) a considerable proportion of ammonia and carbon dioxide which may be present principally in the form of ammonium carbamate or carbonate. It is frequently desirable, furthermore, to employ in the synthesis of urea an excess either of ammonia or of carbon dioxide over that corresponding to the stoichiometric proportions for the formation of urea and, in such a case, the reaction product from the urea synthesis may contain uncombined ammonia or carbon dioxide in addition to ammonium carbamate or carbonate.

One of the major problems in developing a commercially satisfactory method for the synthesis of urea from ammonia and carbon dioxide has been the provision of satisfactory methods for recovering the unconverted ammonia and carbon dioxide from the effluent of the urea autoclave. Heretofore it has been proposed to heat the effluent to drive out the unconverted ammonia and carbon dioxide and return these materials to the autoclave for the production of further quantities of urea. In one process, the ammonia and carbon dioxide distilled from the autoclave effluent are directly compressed without separation for return to the autoclave. This compression, however must be carried out at high temperatures to avoid the formation of solid ammonium carbamate, which high temperature compression involves mechanical difficulties and low efficiencies of the compression step. It has also been proposed to separate the ammonia from the carbon dioxide as, for example, by selective absorption of the ammonia and then recovering the gases separately and separately recompressing them and returning them to the urea synthesis autoclave. Such a mode of operation, however, is costly and adds appreciably to the cost of the urea synthesis.

It is an object of this invention to provide a method for the production of valuable ammonium salts from the unconverted ammonia in the urea synthesis effluent which obviates the necessity of recovering both the ammonia and carbon dioxide for re-use in the urea synthesis process itself and in which the value of the ammonium salt compensates for the cost involved in its production. It is furthermore an object of this invention to provide a novel method for the effective elimination of unconverted ammonia and carbon dioxide from a urea synthesis effluent and the recovery from the gaseous mixture obtained in the treatment of the urea synthesis effluent of ammonia in the form of an ammonium salt and a concentrated carbon dioxide gas which may be readily and economically returned to the urea synthesis.

In carrying out the process of this invention, ammonia and carbon dioxide are heated under pressure to a temperature promoting the formation of urea. The resulting product is passed in contact with an inert gas such as air to strip unconverted ammonia and carbon dioxide from the product. The mixture of gases thus obtained is then treated to separate the ammonia and carbon dioxide from the inert gas. This separation may be accomplished by cooling the gases to a temperature at which the ammonia and carbon dioxide combine to form ammonium carbonate-carbamate; i. e., a product which may consist principally of normal ammonium carbonate, ammonium bicarbonate or of ammonium carbamate, together with more or less of the other named compounds, the exact composition of the product depending upon the ratio of ammonia and carbon dioxide in the cooled gas and the proportion of water combined with the ammonia and carbon dioxide. This cooling of the gases to form ammonium carbonate-carbamate may be accomplished by passing the gases in contact with a solution of ammonium carbonate. Or the gases may be passed in contact with a solution of an ammonium salt such as ammonium nitrate, ammonium sulfate, and the like, to form a solution of ammonium carbonate. It is apparent that in order to accomplish this separation of the ammonium carbonate-carbamate or ammonium carbonate from the inert gas, the inert gas used is one which, like air, is not condensed at temperatures at which the gaseous ammonia and carbon dioxide combine to form solid ammonium carbonate-carbamate or, in the presence of water, a solution of ammonium carbonate. The solution of ammonium carbonate, or the ammonium carbamate-carbonate solid obtained as described, is treated with an acid such as nitric acid, sulfuric acid, phosphoric acid, or the like, to form an ammonium salt and to liberate a concentrated carbon dioxide gas, which may be returned to the urea synthesis step.

Instead of treating with an acid a solution of ammonium carbonate obtained as described above, or prepared by dissolving the solid ammonium carbamate-carbonate recovered from the gases in water, a salt such as sodium chloride, sodium nitrate or sodium sulfate may be dissolved in the solution and it is then carbonated by absorbing carbon dioxide in it to precipitate sodium bicarbonate. The sodium bicarbonate may be filtered from the solution containing ammonium chloride, ammonium nitrate or ammonium sulfate and heated to evolve a concentrated carbon dioxide gas and form the normal sodium carbonate. In case the ammonium carbonate solution in which the sodium salt is dissolved originally contains ammonium bicarbonate, the carbonating of the solution obtained after dissolving the sodium salt may be omitted or materially curtailed.

Ammonium sulfate may also be prepared in accordance with this invention by mixing the ammonium carbonate solution obtained as described above with finely divided calcium sulfate, whereby calcium carbonate is precipitated and a solution of ammonium sulfate formed. After separation of the calcium carbonate from the solution the ammonium sulfate may be recovered by concentrating and crystallizing the ammonium sulfate from the solution. The calcium carbonate may then be decomposed with an acid, for example, nitric acid, to recover the carbon dioxide.

The process of this invention further comprises the modifications of processes described above which involve the direct absorption of the ammonia and carbon dioxide in the gases obtained by distilling the effluent from a urea synthesis autoclave in solutions of sodium salts such as sodium chloride, sodium nitrate or sodium sulfate, or a suspension of calcium sulfate whereby ammonium chloride, ammonium nitrate or ammonium sulfate is directly formed in the solution. Such a procedure simplifies the production of these ammonium salts by not requiring a separate treatment of the ammonia and carbon dioxide gas for the intermediate production of an ammonium carbonate solution.

Figure 2:
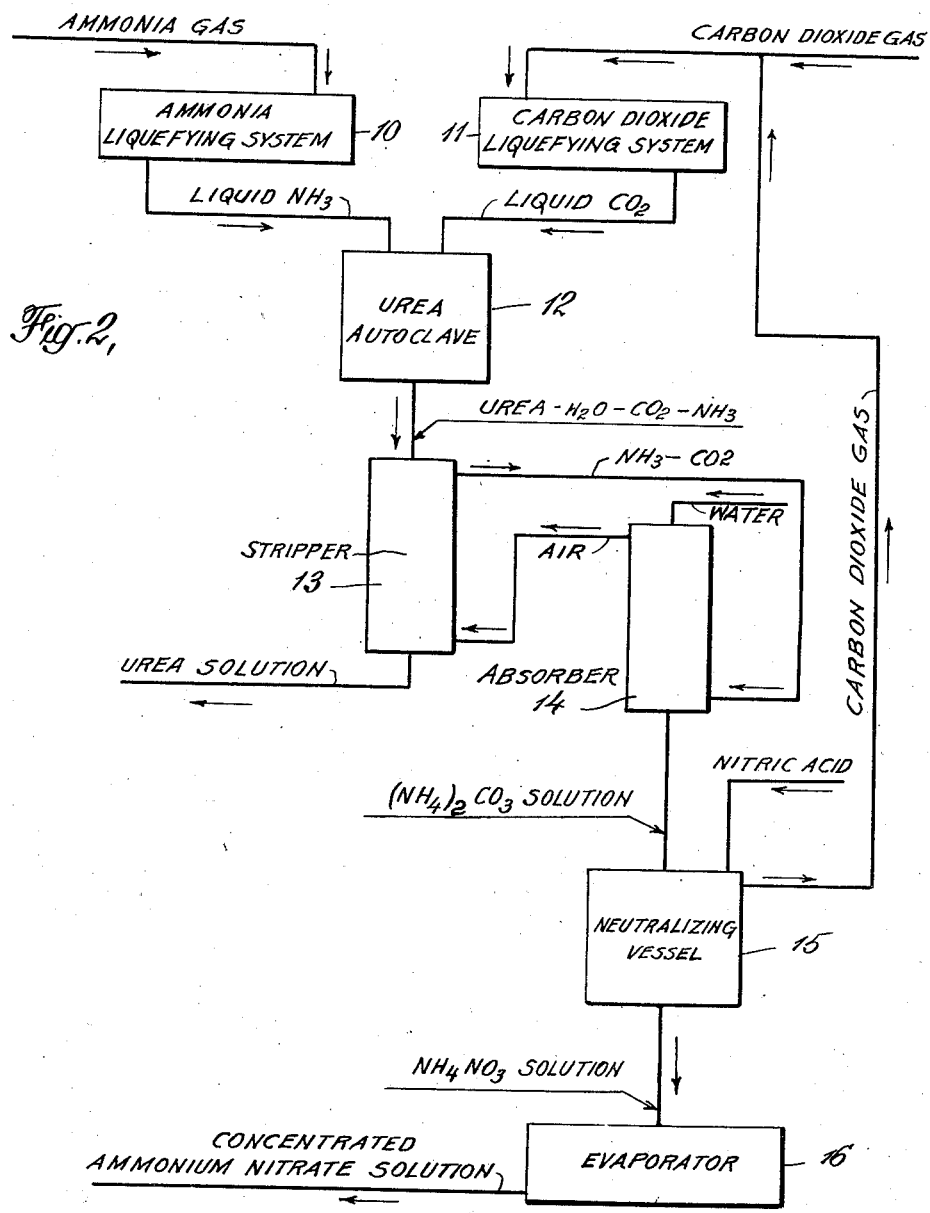

In the accompanying drawings, Fig. 1 shows diagrammatically a process for the production of urea and of ammonium chloride, and Fig. 2 a process for the production of urea and ammonium nitrate, which are illustrative of this invention.

Referring to Fig. 1 of the drawings, ammonia gas is compressed and liquefied in an ammonia liquefying system 1 and carbon dioxide is compressed and liquefied in a carbon dioxide liquefying system 2. The liquid ammonia and liquid carbon dioxide in the proportions of about 2 mols of ammonia for every 1 mol. of carbon dioxide are continuously passed into an autoclave 3 in which the reaction mixture is heated at a temperature of about 150° to 200° C. while maintaining it under a pressure of 100 to 300 atmospheres. The ammonia and carbon dioxide react to form urea and a product containing this material, together with water and unconverted ammonia and carbon dioxide, is continuously withdrawn from the autoclave and passed into the top of a stripper 4, where it is passed in direct contact with air which is introduced into the bottom of stripper 4. Stripper 4 is operated at a pressure materially below that of autoclave 3; for example, a pressure of a few pounds gauge, and as the effluent from the autoclave at an elevated temperature is introduced into the stripper at the lower pressures, ammonia and carbon dioxide are evolved from the melt. The liquor or melt in the top of the stripper may have a temperature of, for example 100° C., which is below the boiling point of the liquor. The air introduced into the stripper may be preheated or the stripper may contain heating coils whereby the heat required for the evolution of the unconverted carbon dioxide and ammonia in addition to the heat already contained in the autoclave effluent may be supplied. Also, steam may be introduced with the air entering the bottom of the stripper to supply a desired amount of heat. If desired, this steam may be introduced into the stripper at an intermediate point instead of into the bottom of the stripper.

A solution of urea substantially free from ammonia and carbon dioxide flows off from the bottom of stripper 4 and may be treated in any desired manner for the recovery of the urea. A gaseous mixture of air, ammonia and carbon dioxide is drawn off from the top of the stripper and conducted to a cooler or absorber 5 while maintaining the gases at a temperature of, for example, 75° C., which is above the temperature at which the ammonia and carbon dioxide would combine to precipitate a solid ammonium carbamate-carbonate in the pipes leading from the stripper to the absorber. Absorber 5 contains an aqueous solution of ammonium carbonate which is maintained at a temperature of about 40° C. This temperature regulation may be accomplished by circulating cooling water through coils submerged in the ammonium carbonate solution. The ammonia and carbon dioxide are absorbed in the ammonium carbonate solution and water is continuously added at a rate sufficient to supply the desired proportion of water for combination with the ammonia and carbon dioxide to form ammonium carbonate and to give a solution of a desired composition. The air separated from the ammonia and carbon dioxide may be returned from absorber 5 for reuse in stripper 4.

The ammonium carbonate solution is passed from absorber 5 into a carbonating column 6 into which sodium chloride is introduced and dissolved in the ammonium carbonate solution and carbon dioxide is passed in contact with the resulting solution to precipitate sodium bicarbonate. The slurry of sodium bicarbonate and solution containing ammonium chloride is passed to a filter 7 for removal of the sodium bicarbonate, and this is heated in a kiln 8 to evolve carbon dioxide and to form soda ash (sodium carbonate). The carbon dioxide evolved in kiln 8 may be returned to liquefying system 2 and thence to the urea synthesis or may in part be returned to carbonating column 6 for treatment of further quantities of ammonium carbonate-sodium chloride solutions. If desired, a relatively dilute carbon dioxide gas may be employed for the treatment of the liquor in carbonating column 6, and the carbon dioxide thus absorbed recovered as a concentrated gas from kiln 8. The solution containing ammonium chloride separated from the sodium bicarbonate in filter 7 may be passed to an evaporator 9 where the solution is concentrated. Solid ammonium chloride may be recovered from the concentrated solution.

Other ammonium salts such as ammonium nitrate or ammonium sulfate may be obtained by dissolving the corresponding sodium salt in the ammonium carbonate solution introduced into carbonating column 6 in the process above described. It is also possible to omit the carbonating of the solution by forming in absorber 5 a solution of ammonium bicarbonate. This may be accomplished by introducing into the absorber carbon dioxide in desired proportion in addition to the carbon dioxide obtained in the gases coming from stripper 4, or by employing in the urea synthesis an excess of carbon dioxide over the proportions of $2NH_3$ to $1CO_2$ so that the gases from stripper 4 contain ammonia and carbon dioxide in the ratio of $1NH_3$ to $1CO_2$.

Instead of treating the ammonium carbonate solution from absorber 5 in the manner described above, this solution containing about 30% $(NH_4)_2CO_3$ at about 40° C. may be agitated with finely divided gypsum $(CaSO_4.2H_2O)$ in the proportions of about 100 parts of the ammonium carbonate solution to about 53 parts of the gypsum. The ammonium carbonate and calcium sulfate react to form ammonium sulfate and calcium carbonate. The calcium carbonate is filtered from the solution of ammonium sulfate and the solution evaporated and ammonium sulfate crystallized out. The calcium carbonate may then be reacted with nitric acid to obtain calcium nitrate with the evolution of carbon dioxide gas which is returned to the urea synthesis.

If desired, the gases containing ammonia and carbon dioxide from stripper 4 may be passed directly into a suspension of finely divided gypsum in water to form ammonium carbonate and ammonium sulfate. Either natural gypsum or a by-product gypsum such as is obtained by treating phosphate rock with nitric acid and precipitating the calcium by addition of ammonium sulfate, may be utilized for the production of the ammonium sulfate. Other ammonium salts such as ammonium nitrate or ammonium chloride may also be obtained by treating the corresponding calcium salt (calcium nitrate or calcium chloride) with the ammonium carbonate solution to precipitate calcium carbonate and leave a solution of ammonium nitrate or ammonium chloride. It is also sometimes advantageous, where an ammonium salt is to be formed from a sodium salt, to directly absorb the ammonia and carbon dioxide in the sodium salt solution, for example sodium chloride solution, and then to carbonate the resulting solution to precipitate out sodium bicarbonate.

Instead of treating the ammonium carbonate solution from absorber 5 for the conversion of the ammonium carbonate into ammonium sulfate, ammonium nitrate or ammonium chloride, ammonium carbonate itself may be recovered as a solid from this solution. For example, the ammonium carbonate solution at 40° C. from absorber 5 may be cooled to 25° C. to crystallize ammonium carbonate therefrom. The crystalline ammonium carbonate is separated from the mother liquor and the latter returned to absorber 5 for the treatment of further quantities of gas from stripper 4. Ammonium bicarbonate may be obtained by introducing additional $CO_2$ into the gas mixture coming from stripper 4 so that the gas contains about 1 mol. ammonia to 1 mol. carbon dioxide. This gas is then passed in contact with an ammonium bicarbonate solution at about 25° C. and solid ammonium carbonate may be recovered from the resulting solution by cooling.

Fig. 2 illustrates a process for the production of ammonium nitrate in accordance with this invention. In this process an ammonia liquefying system 10, carbon dioxide liquefying system 11, urea autoclave 12, and stripper 13 are operated as in carrying out the process of Fig. 1 described above. The gases from stripper 13 are passed into an absorber 14 where they are treated with an aqueous solution of ammonium nitrate containing about 50% $NH_4NO_3$ maintained at a temperature of about 50° C. The ammonium nitrate solution cools the gases from stripper 13 and absorbs the ammonia and carbon dioxide. The solution is treated until it is substantially saturated with ammonium carbamate-carbonate. The resulting solution is withdrawn to a neutralizing vessel 15, where it is treated with 40% nitric acid to form ammonium nitrate and evolve a concentrated carbon dioxide gas, which is returned to liquefying system 11. The ammonium nitrate solution, which may be neutral or slightly acid, is then evaporated in an evaporator 16 to obtain a concentrated solution from which solid ammonium nitrate may be recovered by cooling or the solution may be evaporated under a reduced pressure to crystallization in evaporator 16 and the crystals recovered by filtration. A portion of the solution from neutralizing vessel 15 may be returned to absorber 14 for recovery of ammonia and carbon dioxide from the gases passed through the absorber. The process of Fig. 2 may be operated continuously, if desired. If desired, the neutralization of the ammonium carbamate-carbonate solution formed in absorber 14 may be accomplished by introducing the acid into the solution in the absorber itself, in which case the absorption of the ammonia and carbon dioxide may be continuously carried out by employing duplicate absorption vessels 14 and while one is serving for the treatment of the gases from the stripper, the solution in the other is treated with acid.

The process of this invention presents numerous practical advantages over the methods heretofore employed for the recovery of unconverted ammonia and carbon dioxide from urea synthesis effluents. The expenses involved in the treatment of the gases from the effluent are compensated for by the valuable ammonium salts obtained. Furthermore, the urea synthesis itself may be operated under conditions most favorable with respect to the cost of production of the urea and with respect to the plant construction and operating conditions, without being limited by the requirements with respect to completeness of the reaction imposed by the processes heretofore required for recovery of unconverted ammonia and carbon dioxide. For example, a considerable excess of ammonia may be employed in the urea synthesis step itself with the attendant advantages derivable therefrom, and this ammonia economically recovered as a valuable ammonia salt product. A further advantage of the process of this invention which uses an inert gas such as air for stripping the unconverted ammonia and carbon dioxide from urea synthesis melts, is with respect to the completeness of recovery of these materials from the melt. While the hot product leaving the urea synthesis autoclave, upon reduction of the pressure, will evolve a considerable proportion of the ammonia and carbon dioxide, the complete stripping of the melt by means of heat alone involves a supply of considerable quantities of heat at elevated temperatures. These elevated temperatures promote a decomposition of the urea and are thus inimical to the recovery from the autoclave effluent of all of its urea content. By employing an inert gas in the stripping operation, heat at lower temperatures, which are below the boiling point of the melt itself may be utilized. This is not only economical but has the advantage of decreasing the losses due to decomposition of urea in the melt and at the same time the melt may be substantially completely freed of uncombined ammonia and carbon dioxide.

We claim:

1. The process for the production of urea and an ammonium salt which comprises heating ammonia and carbon dioxide at a urea-forming temperature and pressure, passing the resulting product containing urea, ammonia and carbon dioxide in contact with an inert gas substantially free from ammonia and carbon dioxide at a temperature, below the boiling point of said product, at which the gas strips from the product ammonia and carbon dioxide, said inert gas being one which is not condensed at temperatures at which gaseous ammonia and carbon dioxide combine to form ammonium carbonate-carbamate, cooling the resulting gaseous mixture containing ammonia and carbon dioxide to recover an ammonium carbamate-carbonate material therefrom, separating said carbamate-carbonate material from the inert gas and treating the thus separated material to form an ammonium salt and carbon dioxide gas therefrom.

2. The process for the production of urea and an ammonium salt which comprises heating ammonia and carbon dioxide at a urea-forming temperature and pressure, passing the resulting product containing urea, ammonia and carbon dioxide in contact with an inert gas substantially free from ammonia and carbon dioxide at a temperature, below the boiling point of said product, at which the gas strips from the product ammonia and carbon dioxide, said inert gas being one which is not condensed at temperatures at which gaseous ammonia and carbon dioxide combine to form ammonium carbonate-carbamate, passing the resulting mixture of gases in contact with an aqueous liquor at a temperature at which the ammonia and carbon dioxide are absorbed in the liquor, separating the resulting solution from said inert gas, treating the solution to convert its ammonia content into an ammonium salt and recover carbon dioxide as a gas, and reacting the recovered carbon dioxide with ammonia to form urea.

3. The process for the production of urea and an ammonium salt which comprises heating ammonia and carbon dioxide at a urea-forming temperature and pressure, passing the resulting product containing urea, ammonia and carbon dioxide in contact with an inert gas substantially free from ammonia and carbon dioxide at a temperature, below the boiling point of said product, at which the gas strips from the product ammonia and carbon dioxide, said inert gas being one which is not condensed at temperatures at which gaseous ammonia and carbon dioxide combine to form ammonium carbonate-carbamate, passing the resulting gaseous mixture containing ammonia and carbon dioxide in contact with an aqueous liquor to absorb ammonia and carbon dioxide from said gases, separating the resulting solution from the inert gas and introducing an acid into the solution to form the corresponding ammonium salt and evolve concentrated carbon dioxide gas.

4. The process for the production of urea and an ammonium salt which comprises heating ammonia and carbon dioxide at a urea-forming temperature and pressure, passing the resulting product containing urea, ammonia and carbon dioxide in contact with an inert gas substantially free from ammonia and carbon dioxide at a temperature, below the boiling point of said product, at which the gas strips from the product ammonia and carbon dioxide while maintaining the resulting mixture of gases at a temperature at which the ammonia and carbon dioxide remain in the gaseous phase, said inert gas being one which is not condensed at temperatures at which gaseous ammonia and carbon dioxide combine to form ammonium carbonate-carbamate, cooling said mixture of gases to a temperature at which the ammonia and carbon dioxide combine to form ammonium carbonate-carbamate, separating said ammonium carbonate-carbamate from said inert gas, and treating the thus separated carbonate-carbamate with an acid to convert it into an ammonium salt and carbon dioxide gas.

5. The process for the production of urea and an ammonium salt which comprises heating ammonia and carbon dioxide at a urea-forming temperature and pressure, passing the resulting product containing urea, ammonia and carbon dioxide in contact with an inert gas substantially free from ammonia and carbon dioxide at a temperature, below the boiling point of said product, at which the gas strips from the product ammonia and carbon dioxide, said inert gas being one which is not condensed at temperatures at which gaseous ammonia and carbon dioxide combine to form ammonium carbonate-carbamate, passing the gaseous mixture containing ammonia and carbon dioxide in contact with an aqueous solution of an ammonium salt at a temperature at which the ammonia and carbon dioxide combine to form ammonium carbonate, separating the resulting solution of ammonium carbonate from the inert gas and introducing an acid into the solution containing ammonium carbonate to form the corresponding ammonium salt and to evolve concentrated carbon dioxide gas.

6. The process for the production of urea and ammonium nitrate which comprises heating ammonia and carbon dioxide at a urea-forming temperature and pressure, passing the resulting product containing urea, ammonia and carbon dioxide in contact with air at a temperature, below the boiling point of said product, at which the air strips unconverted ammonia and carbon dioxide from the product while maintaining the resulting mixture of air, ammonia and carbon dioxide at a temperature above that at which the ammonia and carbon dioxide combine to form ammonium carbonate, passing the resulting gases in contact with an aqueous solution of ammonium nitrate at a temperature at which the ammonia and carbon dioxide combine to form ammonium carbonate, separating the resulting solution from the air, neutralizing the solution containing ammonium carbonate with nitric acid and reacting the carbon dioxide evolved from the solution with additional ammonia for the production of urea therefrom.

7. The process for the production of urea and an ammonium salt which comprises heating ammonia and carbon dioxide at a urea-forming temperature and pressure, passing the resulting product containing urea, ammonia and carbon dioxide in contact with an inert gas substantially free from ammonia and carbon dioxide at a temperature, below the boiling point of said product, at which the gas strips from the product ammonia and carbon dioxide, said inert gas being one which is not condensed at temperatures at which gaseous ammonia and carbon dioxide combine to form ammonium carbonate-carbamate, said inert gas being one which is not condensed at temperatures at which gaseous ammonia and carbon dioxide combine to form ammonium carbonate-carbamate, cooling the resulting mixture of gases in contact with a solution of ammonium carbamate-carbonate to absorb ammonia and carbon dioxide from the gases, separating the resulting solution from the inert gas and reacting the resulting solution with finely divided calcium sulfate to form ammonium sulfate and calcium carbonate.

8. The process for the production of urea sodium bicarbonate and ammonium chloride which comprises heating ammonia and carbon dioxide in the proportions of about 2 mols of ammonia for every 1 mol. of carbon dioxide at a urea-forming temperature and pressure, passing the resulting product containing urea, ammonia and carbon dioxide in contact with air at a temperature, below the boiling point of said product, at which the air strips unconverted ammonia and carbon dioxide from the product while maintaining the resulting mixture of air, ammonia and carbon dioxide at a temperature above that at which the ammonia and carbon dioxide combine to form ammonium carbonate, passing the resulting gases in contact with an aqueous solution of ammonium carbonate at a temperature at which the ammonia and carbon dioxide combine to form a carbonate of ammonia and reacting the carbonate of ammonia with sodium chloride to form sodium bicarbonate and ammonium chloride.

9. The process for the production of urea sodium bicarbonate and ammonium chloride which comprises heating ammonia and carbon dioxide in the proportions of about 2 mols of ammonia for every 1 mol. of carbon dioxide at a urea-forming temperature and pressure, passing the resulting product containing urea, ammonia and carbon dioxide in contact with air at a temperature, below the boiling point of said product, at which the air strips unconverted ammonia and carbon dioxide from the product while maintaining the resulting mixture of air, ammonia and carbon dioxide at a temperature above that at which the ammonia and carbon dioxide combine to form ammonium carbonate, passing the resulting gases in contact with an aqueous solution of ammonium carbonate at a temperature at which the ammonia and carbon dioxide combine to form a carbonate of ammonia, dissolving sodium chloride in the solution of carbonate of ammonia thus prepared and carbonating the solution to precipitate sodium bicarbonate therefrom, separating the precipitated sodium bicarbonate from the solution containing ammonium chloride, heating the sodium bicarbonate to evolve carbon dioxide gas therefrom and reacting the carbon dioxide thus obtained with ammonia for the production of urea therefrom.

10. The process for the production of urea and an ammonium salt which comprises heating ammonia and carbon dioxide at a urea-forming temperature and pressure, passing the resulting product containing urea, ammonia and carbon dioxide at a pressure of a few pounds gauge in contact with air at a temperature, below the boiling point of said product at which the air strips therefrom ammonia and carbon dioxide, maintaining the resulting mixture of gases while in contact with said product and subsequent thereto at a temperature at which the ammonia and carbon dioxide remain in the gaseous phase, cooling said mixture of gases after removal from contact with said product to a temperature at which the ammonia and carbon dioxide combine to form ammonium carbonate-carbamate, separating the ammonium carbonate-carbamate from the air and treating said ammonium carbonate-carbamate to form an ammonium salt and concentrated carbon dioxide gas therefrom.

11. The process for the production of urea and an ammonium salt which comprises heating ammonia and carbon dioxide at a urea-forming temperature and pressure, passing the resulting melt containing urea, ammonia and carbon dioxide at a pressure of a few pounds gauge in contact with a stream of air which is continuously recycled in a gas circulatory system in which the melt is treated with the air at a temperature, below the boiling point of the melt, at which the air strips therefrom ammonia and carbon dioxide and the resulting mixture of gases is subsequently cooled to a temperature at which the ammonia and carbon dioxide combine to form an ammonium carbonate-carbamate material, removing said material from contact with the air in said circulatory system, and then treating the ammonium carbonate-carbamate material to form an ammonium salt and concentrated carbon dioxide gas therefrom.

12. The process for the production of urea and an ammonium salt which comprises heating ammonia and carbon dioxide at a urea-forming temperature and pressure, passing the resulting product containing urea, ammonia and carbon dioxide at a pressure of a few pounds gauge in contact with a stream of an inert gas which is continuously recycled in a gas circulatory system in which the melt is treated with the inert gas at a temperature, below the boiling point of the melt, at which the gas strips therefrom ammonia and carbon dioxide and the resulting mixture of gases is subsequently cooled to a temperature at which the ammonia and carbon dioxide combine to form an ammonium carbonate-carbamate material, removing said material from contact with the inert gas in said circulatory system, and then treating the ammonium carbonate-carbamate material to form an ammonium salt and concentrated carbon dioxide gas therefrom.

13. The process for the production of urea and an ammonium salt which comprises heating ammonia and carbon dioxide at a urea-forming temperature and pressure, passing the resulting product containing urea, ammonia and carbon dioxide at a pressure of a few pounds gauge in contact with a stream of an inert gas which is continuously recycled in a gas circulatory system in which the melt is treated with the inert gas at a temperature, below the boiling point of the melt, at which the gas strips therefrom ammonia and carbon dioxide and the resulting mixture of gases is subsequently passed in contact with an aqueous liquor to absorb ammonia and carbon dioxide from said gases, separating the resulting solution from the inert gas and introducing an acid into the solution to form the corresponding ammonium salt and evolve concentrated carbon dioxide gas.

14. The process for the production of urea and an ammonium salt which comprises heating ammonia and carbon dioxide at a urea-forming temperature, passing the resulting product containing urea, ammonia and carbon dioxide in contact with an inert gas substantially free from ammonia and carbon dioxide at a temperature, below the boiling point of said product, at which the gas strips from the product ammonia and carbon dioxide, said inert gas being one which is not condensed at temperatures at which gaseous ammonia and carbon dioxide combine to form ammonium carbonate-carbamate, and cooling the resulting gaseous mixture containing ammonia and carbon dioxide to recover an ammonium carbamate-carbonate material therefrom.

15. The process for the production of urea and an ammonium salt which comprises heating ammonia and carbon dioxide at a urea-forming temperature, passing the resulting product containing urea, ammonia and carbon dioxide in contact with an inert gas substantially free from ammonia and carbon dioxide at a temperature, below the boiling point of said product, at which the gas strips from the product ammonia and carbon dioxide, said inert gas being one which is not condensed at temperatures at which gaseous ammonia and carbon dioxide combine to form ammonium carbonate-carbamate, passing the resulting mixture of gases in contact with an aqueous liquor at a temperature at which both the ammonia and carbon dioxide are absorbed in the liquor to form an ammonium carbamate-carbonate material, separating the resulting solution from the inert gas and treating the thus separated solution to convert its ammonia content into an ammonium salt of the group consisting of ammonium sulfate, ammonium nitrate, ammonium chloride and ammonium phosphate.

CHARLES K. LAWRENCE.
HERMAN A. BEEKHUIS, Jr.